Jan. 12, 1943.  B. WILKINSON ET AL  2,308,342
PETROL AND LIKE PIPES FOR USE IN AIRCRAFT
Filed Jan. 27, 1941
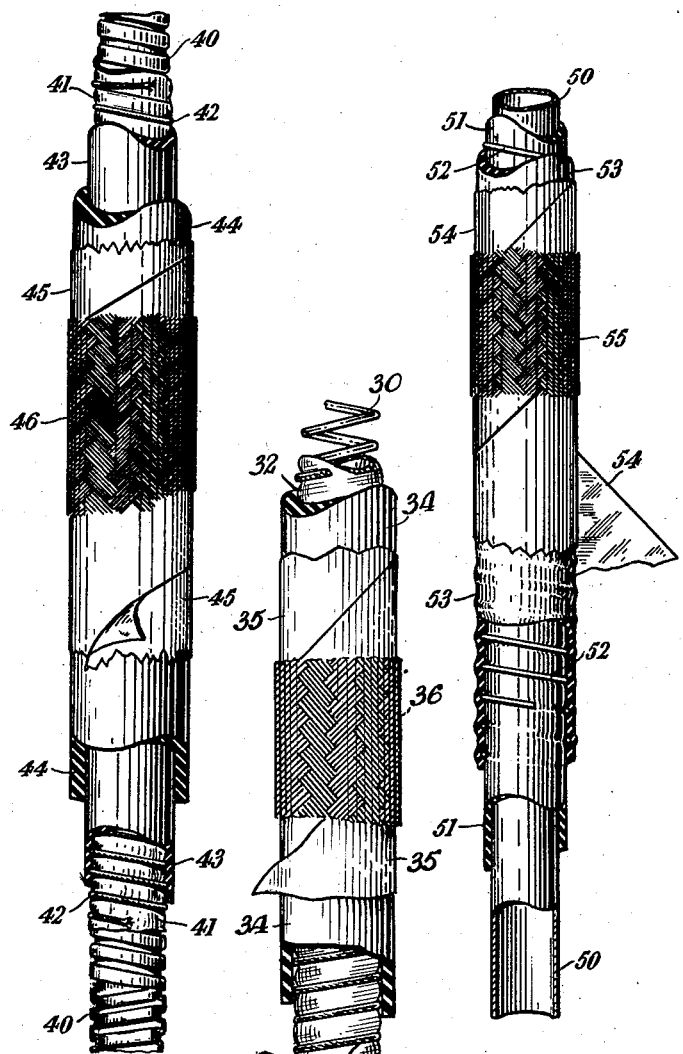

Patented Jan. 12, 1943

2,308,342

UNITED STATES PATENT OFFICE 2,308,342

PETROL AND LIKE PIPES FOR USE IN AIRCRAFT

Bernard Wilkinson, London, and William Donald Douglas, Farnborough, England; said Wilkinson assignor to The Wilkinson Process Rubber Company Limited, Kuala Lumpur, Selangor, Federated Malay States Application January 27, 1941, Serial No. 376,204
In Great Britain January 22, 1940

4 Claims. (Cl. 138—55)

The object of this invention is to provide a petrol or oil pipe for use in aircraft which will be self-sealing so as to prevent the escape of liquid should the pipe be struck by a bullet.

The invention includes a flexible self-sealing pipe for petrol or oil which comprises a tubular layer of rubber having the property of swelling when in contact with petrol or oil, a tubular layer located inside the layer of rubber and made of a material impervious to the action of petrol or oil, a helical winding of a rigid stiffening material, and an external protective covering.

When such a pipe is pierced by a bullet, the liquid flowing out through the hole will cause the rubber to swell and close the hole. The preferred form of rubber is the material described in British Patent No. 437,928 and sold under the Registered Trade Mark "Linatex." This material is manufactured directly from rubber latex by incorporating in the latex a vulcanizing ingredient, such as sulphur, and an accelerator, coagulating the mixture, separating the coagulum from the residual liquor, preparing crepe or sheet rubber from the coagulum, drying the rubber under conditions such that substantially no vulcanization occurs, and thereafter effecting very slow vulcanization of the dry rubber, the period of vulcanization extending from at least one or two weeks up to several months. In addition to the several physical and chemical properties of Linatex enumerated in the British patent identified above, the material has a hitherto unknown chemical property which renders it particularly valuable as bulletproofing material for fuel pipes. This is the property of swelling without substantial loss of mechanical strength when exposed to the action of petrol. Furthermore, the material is not soluble to any extent in this fuel. Because of these properties a layer of Linatex is found to give protection equivalent to that of any other known swellable rubber composition of twice the thickness. Moreover, owing to its high mechanical strength, it resists tearing and exercises a mechanical closing effect on a wound formed by a bullet puncture. This high mechanical strength is of special value in the construction of flexible pipe.

It is customary, in flexible pipes, to use an inner helix of metal wire constituting the core of the pipe, for the purpose of stiffening the pipe and enabling it to withstand the pressure of the liquid passing through it. The presence of an internal coil of metal wire in a flexible petrol or oil pipe is, however, undesirable because of the destructive effect of the small pieces into which the metal wire will be shattered by the impact of a bullet, the fragments of metal tending to distend the wound and cause leakage. The invention therefore further contemplates the replacement of the inner coil of metal wire in such a flexible pipe by a coil of non-metallic material. The inner coil may be made of any non-splintering non-metallic material of sufficient rigidity and yet of sufficient flexibility to enable it to be bent into a coil. For instance, it may be made of cellulose, cellulose acetate or vulcanized fibre.

The invention includes a flexible self-sealing petrol or oil pipe which consists of a tubular body of Linatex or equivalent rubber having a helix of metal wire embedded in it, an internal layer of a material which will protect the Linatex against the action of the petrol or oil in the pipe and an external protective covering. We have found, as a result of shooting tests, that the wire helix embedded in the Linatex does not, like an internal wire helix, shatter into pieces which increases the destructive effect of the bullet. It tends to break off sharp and does not distend the wound and cause leakage.

Some practical embodiments of the invention will now de described in detail, by way of example, with reference to the accompanying drawing, in which—

Figures 1, 2 and 3 are elevations, partly broken away, illustrating how the invention may be used to render self-sealing different forms of flexible pipes of otherwise known construction.

The flexible pipe shown in Figure 1, has an inner coil 30 of cellulosic material, around which is wrapped a layer 31 of pig's gut. Around the pig's gut is a layer of canvas 32 bound with string 33. Cemented to this is a layer 34 of ⅛" Linatex which, in turn, is enclosed by a wrapping 35 of the regenerated cellulose material known under the registered trade-mark "Cellophane" and an outer envelope 36 of woven or braided metal. The pig's gut, being impervious to the action of petrol or oil, protects the Linatex from the contents of the pipe under normal conditions. It is found that the "Cellophane" layer in conjunction with the outer envelope of woven metal serves to improve the flame-resisting properties of the pipe.

The flexible pipe shown in Figure 2 has a core constituted by a flexible metal tube 40, surrounded by a layer 41 of Cellophane held in place by a string bonding 42. Around this is a layer 43 of neoprene or synthetic rubber which is impervious to the action of petrol or oil. Outside this and cemented to it is the layer 44 of Linatex which, in turn, is enclosed by a layer 45 of Cellophane and an outer protecting envelope 46 of woven or braided metal. The metal tube 40, which constitutes the core of the pipe, stiffens the pipe and gives it the strength necessary to withstand the pressure of the liquid inside it. This type of flexible tube, provided it is made of light gauge metal, does not tend to shatter like a core constituted by a spiral of metal wire.

The flexible pipe shown in Figure 3 has an inner lining 50 of polyvinyl resin. Surrounding this is a layer 51 of Linatex bonded to the resin lining. Around the Linatex is a helix 52 of fine high tensile steel wire. Then comes a second layer 53 of Linatex, cemented to the inner layer 51 and serving to lock the wire helix 52 in position. The wire helix 52 is therefore embedded in the Linatex and is unable to shatter in pieces which would distend the wound made by a bullet. Surrounding this is a layer 54 of Cellophane enclosed by an external envelope 55 of woven or braided metal.

In the case of each of the flexible pipes shown in Figures 1-3, it is desirable to coat the Linatex externally with neoprene paint to protect it from the effects of petrol which might accidentally come into contact with the exterior of the pipe.

Due to the property of the Linatex of swelling when in contact with petrol or oil, it is effective in every instance in closing holes in the pipe made by bullets. Although we prefer to use Linatex as the sealing agent, our invention includes the substitution for it of other types of rubber having similar properties from the sealing point of view.

What we claim as our invention and desire to secure by Letters Patent is:

1. A flexible self-sealing pipe for petrol or oil, which comprises a tubular layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, a tubular layer located inside the layer of rubber and made of a material impervious to the action of petrol or oil, a helical winding of a rigid non-metallic, non-splintering stiffening material, and an external protective covering.

2. A flexible self-sealing pipe for petrol or oil, which comprises a tubular layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, a tubular layer located inside the rubber, of a material impervious to the action of petrol or oil, a helical winding of a rigid non-splintering, non-metallic material and an external protective covering consisting of a layer of regenerated cellulose covered by a layer of woven or braided metal.

3. A flexible self-sealing pipe for petrol or oil, which comprises a tubular layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, a tubular layer of synthetic rubber inside the said rubber composition, a helical winding of a rigid non-metallic stiffening material, and an external protective covering.

4. A flexible self-sealing pipe for petrol or oil, comprising an inner tubular layer of a material impervious to the action of petrol or oil, a surrounding tubular layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, a helical winding of rigid stiffening material embedded in the rubber and an external protecting envelope.

BERNARD WILKINSON.
WILLIAM DONALD DOUGLAS.